June 18, 1968 E. C. KOVACIC 3,389,054
RADIAL SPLIT FLOW BREEDER REACTOR
Filed May 26, 1967 2 Sheets-Sheet 1
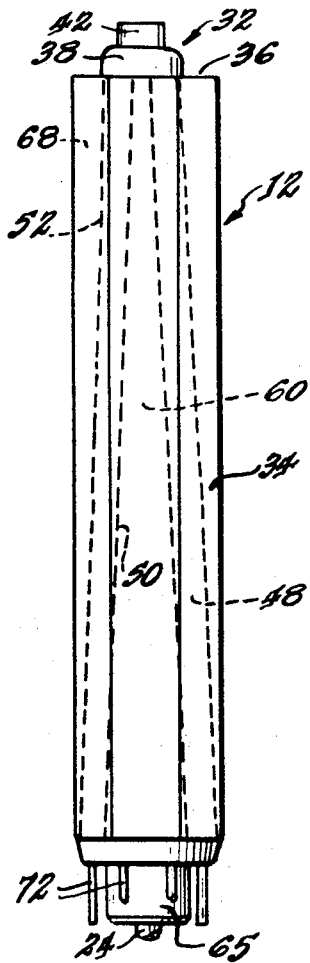
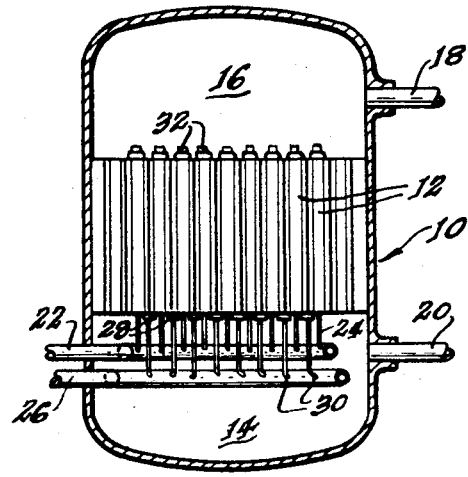
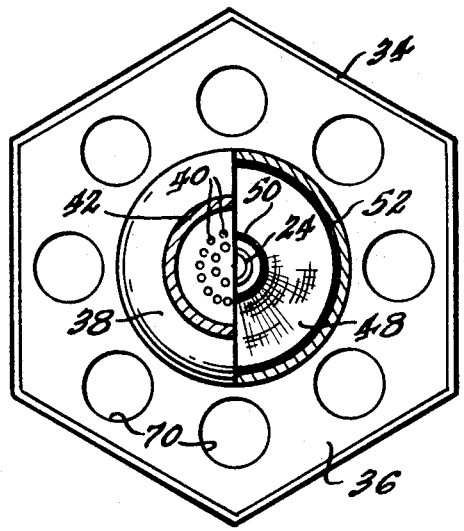
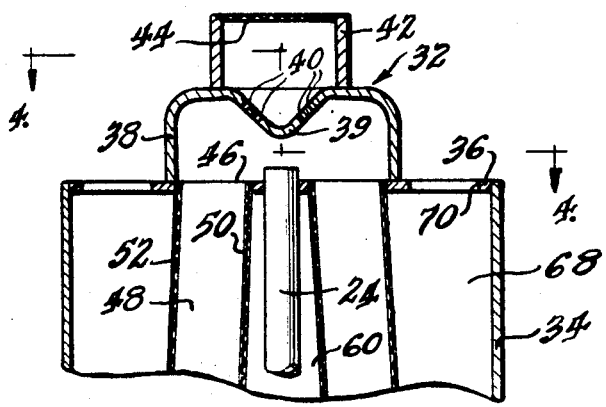
Inventor
Evan C. Kovacic
By: [signature]
Attorney

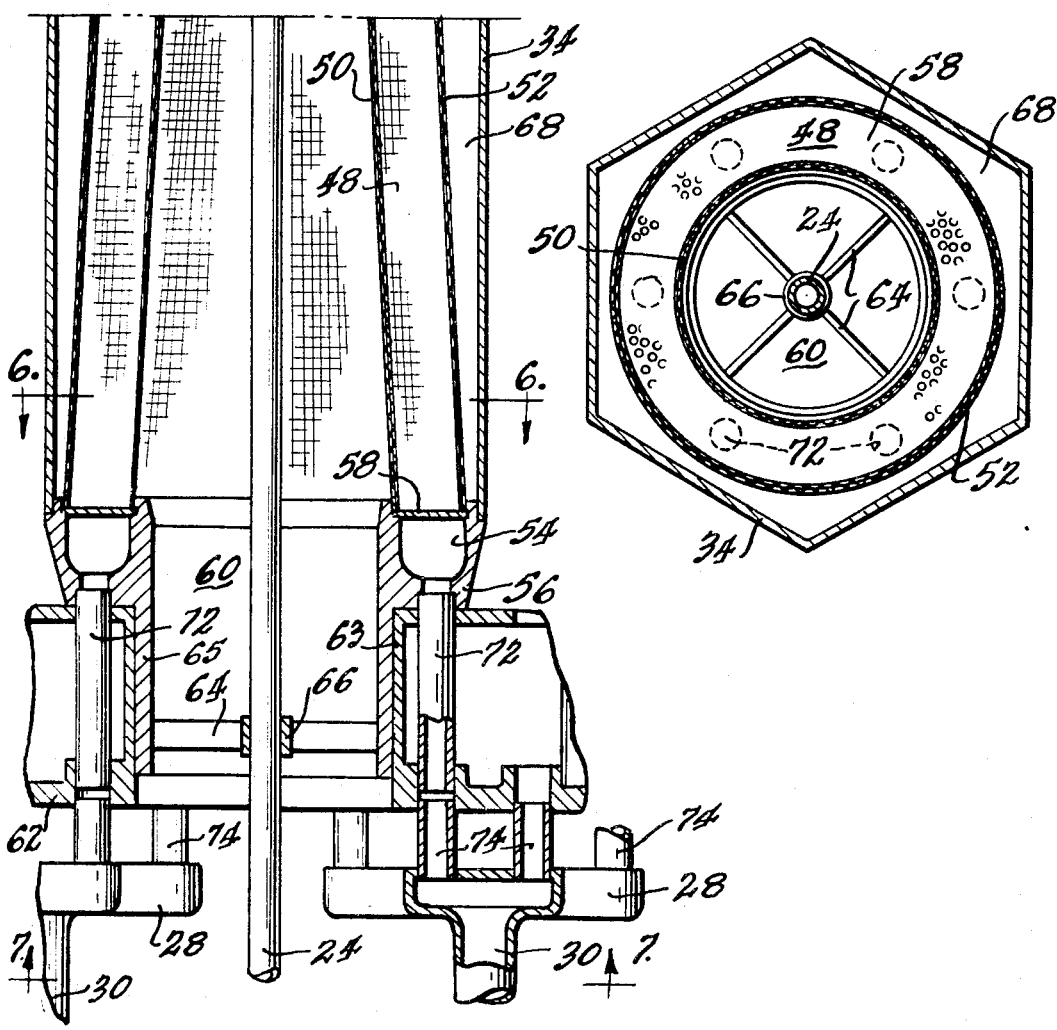
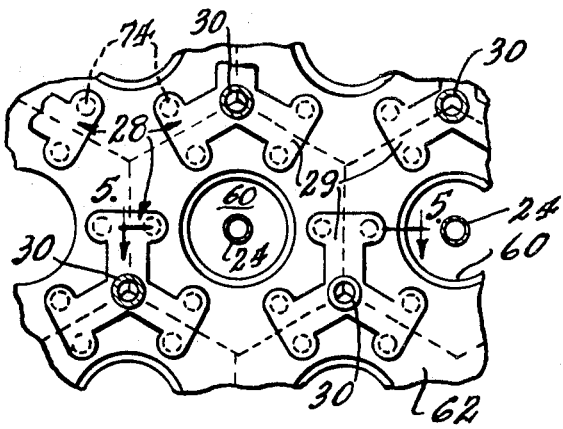

United States Patent Office 3,389,054
Patented June 18, 1968

3,389,054
RADIAL SPLIT FLOW BREEDER REACTOR
Evan C. Kovacic, Trenton, Mich., assignor to the United States of America as represented by the United States Atomic Energy Commission
Filed May 26, 1967, Ser. No. 643,026
8 Claims. (Cl. 176—32)

ABSTRACT OF THE DISCLOSURE

Discrete fuel particles are contained as a settled bed in an annulus formed between two concentric truncated conical screens. Liquid metal coolant is passed radially through the bed in direct contact with the fuel particles.

Contractual origin of the invention

The invention described herein was made in the course of, or under, a contract with the United States Atomic Energy Commission.

Background of the invention

This invention relates to a fast breeder reactor in which the coolant and fuel are in direct contact. More specifically, the fuel in the form of discrete particles is retained between two concentric conically shaped screens and the coolant is passed therethrough.

The future of electrical power produced by nuclear reactors appears to reside in the development of breeder reactors. Breeder reactors produce more usable fuel than they consume. The fuel in a breeder reactor may consist of uranium-235 or plutonium-239 or a combination thereof as major constituents of a core surrounded by a blanket containing uranium-238. During operation of the reactor, uranium-238 in the blanket is converted to plutonium-239 which then may be used as core material. Eventually both the core and the blanket must be reprocessed in order to recover the unused fissile material from the core and the newly produced fissile material in the blanket.

There are several problems in the design and operation of a breeder reactor that had not been encountered with other reactors. In a breeder reactor, large amounts of plutonium are intentionally produced for recovery and processing into fuel. Since plutonium is one of the deadliest elements known to mankind, extraordinary safety precautions must be used when handling large amounts of this material. As a result of this requirement practically all of the reprocessing operations are performed entirely by automation behind heavy radiation shielding. Because these operations are remotely controlled and plutonium is so dangerous, breakdown in the equipment presents a much more serious problem in plutonium reprocessing than it does in uranium-235 or irradiated uranium-238 reprocessing.

Another problem encountered with breeder reactors is in the choice of coolant. One of the few materials that can be used is liquid sodium, but it is opaque, becomes highly radioactive upon exposure to radiation and is extremely corrosive in the presence of impurities such as oxygen.

When conventional fuel elements, consisting of a fissile core surrounded by a cladding material, are used in a sodium-cooled reactor, fission products produced during irradiation present an additional problem. Conventional fuel elements generally operate at very high temperatures so that fission gases and volatile liquid and solid fission products produced by irradiation boil off of the fissile core in the fuel element and collect inside the cladding. Fuel elements must be designed for collection of these gases and other fission products which result in impaired heat transfer between the fissile core and the coolant. If the cladding fails, the fission products vent to the sodium coolant and may cause further problems if the reactor is not specifically designed to cope with them.

Summary of the invention

The reactor of this invention utilizes a mobile fuel in direct contact with the coolant to avoid all the problems discussed above. The reactor has a plurality of fuel modules in which the fuel, in the form of small spheres, is retained as a settled bed in an annulus formed by two concentric conical screens. The coolant passes radially through the screens in direct contact with the fuel and thence out of the module. There are several advantages to this invention.

Since the fuel is mobile it is easily charged into and discharged from the reactor. Intermittent fluidization during operation aids in obtaining uniform fuel burnup and plutonium production. This is in distinction to conventional fuel elements which must be rotated in the reactor during operation in order to obtain uniform fuel burnup and plutonium production. Rotating fuel elements surrounded by liquid metal coolant requires sophisticated machinery unnecessary with the reactor of this invention. The process of loading and unloading conventional fuel elements is complicated and difficult; so, excess reactivity is built into the reactor in order that fuel will not have to be added as fission products build up in the system.

Building excess reactivity into a reactor is bad for at least two reasons. The control system has to be more complex than usual because extra radioactive material is present in addition to the critical mass of fuel already in the reactor. More control equipment increases the core size, and the greater the core size the lower the breeding ratio. Also, excess reactivity means greater fuel inventory, therefore higher fuel costs, lower breeding ratios and larger doubling time.

Mobile fuel can easily be loaded into and unloaded from a reactor and direct contact of the fuel and coolant removes any fission products vented from the particles. These two facts make it unnecessary to build in excess reactivity so that control requirements are reduced, core size is reduced, fuel inventory is reduced and breeding ratio is improved.

Brief description of the drawings

The nuclear breeder reactor of this invention may be more readily understood by reference to the following drawings in which:

FIG. 1 is a vertical cross-sectional view of the reactor of this invention;

FIG. 2 is a side elevation of a fuel module therefor;

FIG. 3 is an enlarged sectional view of the top portion of the fuel module shown in FIG. 2;

FIG. 4 is a horizontal sectional view taken on the two levels indicated by the line 4—4 of FIG. 3;

FIG. 5 is an enlarged sectional view of the bottom portion of the fuel module shown in FIG. 1 taken along line 5—5 in FIG. 7 and also shows a portion of the core support structure;

FIG. 6 is a horizontal sectional view taken along the line 6—6 of FIG. 5; and

FIG. 7 is a horizontal sectional view taken along the line 7—7 of FIG. 5.

Description of the preferred embodiment

With reference to FIG. 1, reactor vessel 10 contains a plurality of fuel modules 12, a high-pressure coolant inlet plenum 14 disposed at the bottom of the vessel 10 and a low-pressure coolant outlet plenum 16 disposed at the top of the vessel 10. A coolant outlet pipe 18 leads from low-pressure plenum 16 to a heat exchanger (not shown) and a coolant inlet pipe 20 returns coolant from the heat exchanger to high-pressure plenum 14. Fuel slurry enters reactor vessel 10 through slurry inlet distribution header 22, located in coolant inlet plenum 14, and then passes to fuel modules 12 through slurry inlet pipes 24. Slurry is discharged from fuel modules 12 into a slurry outlet collection header 26 from manifolds 28 through manifold outlet pipes 30. When slurry enters modules 12 excess carrier fluid discharges from modules 12 into low-pressure plenum 16 through separators 32.

Referring next to FIG. 2, each module 12 includes an elongated hexagonal wall 34 and top plate 36. Slurry consisting of fuel particles and carrier fluid enters a module 12 through slurry inlet pipe 24 and flows upward the length of module 12 through pipe 24 into separator 32 located at the top of module 12.

The upper portion of module 12 will next be described with particular reference to FIGS. 3 and 4. Slurry inlet pipe 24 is held securely in place at the top of module 12 by top plate 36. A lower section 38 of separator 32 is circular in cross section and is sealed to support plate 36. The top of lower section 38 is formed into a baffle 39 taking the form of a blunted cone with the nose pointed down. Fuel particles in the slurry entering separator 32 from slurry inlet pipe 24 contact baffle 39 and flow radially outward and downward from slurry inlet pipe 24. Baffle 39 has apertures 40 which face 90 degrees from the fuel particle flow path. Apertures 40 connect lower section 38 with an upper section 42 of separator 32. Upper section 42 is circular in cross section, is sealed to lower section 38 and has screen 44 as its top. Separator 32 is located in plenum 16.

Top plate 36 has an annular opening 46 which connects separator 32 with an annulus 48 formed by inner and outer concentric truncated conical screens 50 and 52. Conical screens 50 and 52 are fastened to plate 36 at the top of module 12, are inclined inwardly and upwardly, and may be made of sintered metal or double screens with a fine mesh screen on the inside backed by a larger and heavier mesh screen outside.

Referring now to FIGS. 5, 6 and 7, screens 50 and 52 extend from top plate 36 downward to annular trough 54 in transition section 56. An annular orifice plate 58 is disposed at the bottom of annulus 48, separating annulus 48 from trough 54. Transition section 56 supports hexagonal wall 34 and transforms the hexagonal cross section of wall 34 into a circular cross section at the center of transition section 56. Transition section 56 is hollow and surrounds the bottom of coolant inlet chamber 60. Coolant inlet chamber 60 is bounded by transition section 56 and inner screen 50. Fuel modules 12 are supported by fuel module support grid 62 which has circular apertures 63 therein arranged in a hexagonal pattern. A circular fuel module support cylinder 65 depends from transition section 56 and is seated in circular apertures 63. Spider arms 64 extend between transition section 56 and a spider collar 66 which surrounds and holds slurry inlet pipe 24 firmly in place near its lower end.

Coolant flow is upward through coolant inlet chamber 60, then radially through inner screen 50, annulus 48, and outer screen 52, then upward through a coolant outlet chamber 68. Coolant outlet chamber 68 is formed between outer screen 52 and hexagonal wall 34 and leads to low-pressure plenum 16 through coolant outlet ports 70 in support plate 36 (see FIG. 4).

Fuel particles in annulus 48 are discharged into collection header 26 through orifice plate 58 and trough 54. Six slurry outlet pipes 72 lead from trough 54 in transition section 56 through fuel module support grid 62 into manifold inlet pipes 74 and manifolds 28. As shown in FIG. 7, manifolds 28 include three T-shaped branches 29 which are 120 degrees apart and joined at the bases of the T's. Inlet pipes 74 deliver slurry into the manifold 28 at the ends of the cross bar of the T. In view of the hexagonal configuration of the fuel module, location of the center of the module at the junction of three fuel modules makes it possible for each module to deliver slurry into three different manifolds and each manifold collects slurry from three different fuel modules. Thus, even if one manifold becomes clogged, a fuel module can still be unloaded through two manifolds. Manifold outlet pipes 30 lead from the center of the manifold to collection header 26 (see FIG. 1).

In operation, slurry is introduced into reactor vessel 10 through slurry distribution header 22. From distribution header 22 the slurry flows into and upwardly through fuel module 12 via slurry inlet pipe 24. In separator 32 fuel particles contact baffle 39 and flow radially outward and downward through annular opening 46 in support plate 36. Excess carrier fluid in the slurry flows through apertures 40 in baffle 39 into upper section 42, through screen 44 and into low-pressure plenum outlet 16. Screen 44 prevents any particles carried with the excess fluid from venting to plenum 16. After annulus 48 is filled with fuel particles, a settled bed is formed between top plate 36 and orifice plate 58. The fuel particles near the bottom of annulus 48 have a tendency to pack, and orifice plate 58 has holes small enough so as to prevent a great many fuel particles from settling into slurry outlet pipes 72, manifolds 28, manifold outlet pipes 30 and collection header 26. Conventional control means (not shown) are provided to maintain control over reactivity levels during the entire operation of the reactor.

After annulus 48 is filled, the slurry inlet system is shut off and the coolant system started. Coolant flows into reactor vessel 10 through coolant inlet pipe 20 to high-pressure inlet plenum 14. Coolant enters module 12 through a channel formed by support cylinder 65 and flows upward through coolant inlet chamber 60. Coolant flows radially through inner screen 50, contacts fuel particles in annulus 48 and flows from annulus 48 through outer screen 52. The conical shape of annulus 48 provides a large flow area for coolant to contact the fuel particles but a short coolant flow path in the bed. This unique feature is a particular advantage for reactor cores. The coolant which has been heated by contact with the fuel particles flows upwards in coolant outlet chamber 68 through coolant outlet ports 70 in support top 36 into low-pressure outlet plenum 16. The heated coolant is transported from plenum 16 via coolant outlet pipe 18 to a heat exchanger (not shown). Coolant from the heat exchanger is returned to high-pressure inlet plenum 14 via coolant inlet pipe 20.

During coolant flow, some of the fuel particles in annulus 48 expand past top plate 36 into separator 32. Any fuel particles which flow through apertures 40 in baffle 39 are prevented from venting to low-pressure outlet plenum 16 by screen 44 across the top of upper section 42 of separator 32. As in other mobile fuel systems for fast breeder reactors, intermittent fluidization is used to produce uniform particle burnup and plutonium production. Fluidization is accomplished by introducing carrier liquid or coolant through manifold 28 and slurry outlet pipe 72. The bed of fuel particles expands into separator 32 and downwardly through slurry inlet pipe 24. After sufficient mixing, inlet flow through manifold 28 is terminated and fuel particles in slurry inlet pipe 24 are forced back into annulus 48. Normal reactor operation is then continued.

An additional benefit derived from fluidization is that particle movement helps to prevent screens 50 and 52 from clogging during operation. If screens 50 and 52 do clog during reactor operation, then fission products and other contaminants in the coolant can be removed prior to return of the coolant to high-pressure inlet plenum 14.

The fuel particles may be uranium and/or plutonium containing ceramics; however, the dioxides are preferred. The ratio of plutonium or uranium-235 to uranium-238 depends upon whether the module 12 is to be used as part of a core or a blanket. The physical characteristics of modules 12 do not change whether the module 12 is in the core or blanket but the chemical content of the particles and the ratio of fissile to fertile particles in annulus 48 do change. The coolant as well as carrier fluid for the slurry is a liquid metal. Lithium, sodium, potassium and combinations thereof may be used, but sodium is preferred.

The reactor described above has several advantages besides those heretofore mentioned. The particulate fuel and direct coolant contact therewith results in high heat transfer surface for the volume of fuel present. This allows high heat removal from the fuel particles with low heat flux at the particle surface. High power density is obtainable which permits smaller core volume, lower fuel inventory, and higher breeding ratio.

Power density increases and thermal stress on the particle decreases with decrease in particle size. For instance, a calculated power density for spherical particles 0.05" in diameter is 4647 kw./liter but for particles 0.01" in diameter the power density is 116,100 kw./liter. The problem is that the smaller the particle diameter the greater the pressure drop across the bed. Conversely, increasing the particle diameter lowers the pressure drop across the bed but increases the thermal stresses in the particle and decreases the power density. The above dilemma is solved to a degree by using a smaller particle diameter but at the same time reducing the bed diameter. This combination keeps the pressure drop across the bed down to reasonable values yet permits high power density. The reduced bed diameter benefits the breeding ratio, because it results in a higher ratio of core length to core diameter which increases radial leakage from the core. Since axial blankets are impractical with mobile fuel systems because of the associated piping, only radial blankets are used. Hence, the larger the radial leakage from the core, the better the breeding ratio. The following table sets out some of the design parameters for a 1000 mwe. mixed oxide reactor.

| System: | Radial split flow |
|---|---|
| Doppler coefficient, $dK/dt$ | $6.7 \times 10^{-6}$/F. |
| Specific power: | |
|   Core U+Pu, kw./kg. | 134.1 |
|   Core fissile Pu, kw./kg. | 1. |
| Fuel mixture power density, kw./liter (25% overpower) | 1538 |
| Core power, mwt. | 2200. |
| Size: | |
|   Core diameter, in. | 95.0 |
|   Core height, in. | 60. |
| Temperature: | |
|   Core inlet, °F. | 900. |
|   Structural peak, °F. | 1406. |
|   Max. bed Na temp., °F. (1600°F. limit) at 25% overpower | 1406. |
|   Max. particle temp. at 25% overpower | 1632. |
|   Core outlet, °F. | 1200. |
| Coolant: | |
|   Sodium flow, lb./hr. | $83.4 \times 10^{-6}$. |
|   Core pressure drop, p.s.i. | 75. |
|   Sodium velocity, ft./sec., max. | 50. |
| Control material | $B_4C$. |
| Fuel burnup, mwd./mt. oxide | 100,000. |
| Core loading: | |
|   Core fissile Pu metal ~kg. | 1,809. |
|   Core metal ~kg. | 16,395. |
|   Core ceramic ~kg. | 18,620. |
| Fuel composition | |
|   Plutonium composition, w/o— | |
|     Pu-239   75 | |
|     240   20 | |
|     241   5 | |
| Uranium/plutonium ratio (kg. U/total kg. Pu) | 5.3. |
| Core volume | 6974. |
| Fuel fraction (solid) | 0.255. |
| Sodium fraction | 0.708. |
| Steel fraction | 0.037. |
| Assemblies: | |
|   Number of assemblies/core | 61. |
|   Assembly across flats, in. | 11.25. |
|   Fuel cartridge thickness, in. | 2.26. |
|   Fuel cartridge shape | Hollow cone. |
|   Fuel material | Mixed oxide. |
|   Density percent of theoretical | 95. |
|   Density, gm./cc. | 11.0. |
|   Conductiivty, B.t.u./hr.-ft.-F. | 1.8. |
|   Fuel form | Sph. particles |
|   Particle diameter, in. (mean) | 0.050. |
|   Mode of operation, fuel circulation | Continuous. |
|   Peak to ave. power [1] | 2.5. |
|   Maximum heat flux, B.t.u./hr.-ft.[2] | [2] 260,000. |
| Structural: | |
|   Material | 304 SS. |
|   Allowable fuel thermal stress, p.s.i. (max.) | 25,000. |
|   Paste volume fraction ratio fuel/sodium | 70/30. |

[1] Assumes for thermal and hydraulic analyses.
[2] Occurs on particle surface.

It will be understood that the invention is not to be limited to the details given herein but that it may be modified within the scope of the appended claims.

The embodiments of the invention in which an exclusive property or privilege is claimed are defined as follows:

1. A fast breeder nuclear reactor comprising a high-pressure coolant plenum, a low-pressure coolant plenum and a plurality of fuel modules therebetween, each module including:
    a coolant inlet in communication with said high-pressure plenum;
    a coolant outlet in communication with said low-pressure plenum;
    means for maintaining a thin settled bed of plutonium and/or uranium containing particles between the coolant inlet and the coolant outlet, said means comprising a pair of truncated concentric conically shaped screens defining an annulus therebetween, said screens being inclined inwardly and upwardly; and
    means for passing a liquid metal coolant radially through said bed.

2. The reactor of claim 1 and further comprising a slurry inlet pipe entering said modules at the bottom thereof and extending upwardly therethrough, a baffle at the top of said modules for distributing to said annulus plutonium and/or uranium containing particles entering said modules through said slurry inlet pipes and means for removing said particles from said annulus.

3. The reactor of claim 2 wherein the means for removing said particles from each of said modules comprises:
    an orifice plate at the bottom of said annulus;
    a plurality of manifolds;
    a plurality of slurry outlet pipes between said orifice plate and said manifolds, each manifold receiving less than the total number of slurry outlet pipes from said orifice plates; and
    means for fluidizing said settled bed so as to allow said fuel particles to drain through said orifice plate.

4. The reactor of claim 3 wherein the plurality of slurry outlet pipes from each of said modules are six in number and each manifold receives two slurry outlet pipes from each module.

5. The reactor of claim 4 and further comprising means for admitting a slurry of plutonium dioxide and/or uranium dioxide particles carried in liquid sodium into said slurry inlet pipe.

6. A fuel module for a fast breeder reactor comprising:

an elongated shell;
a coolant inlet into said shell;
a coolant outlet from said shell;
means for maintaining a thin settled bed of plutonium and/or uranium containing particles in said shell, said means comprising a pair of truncated concentric conically shaped screens defining an annulus therebetween, said screens being inclined inwardly and upwardly; and
means for passing a liquid metal coolant radially through said bed.

7. The module of claim 6 and further comprising a slurry inlet pipe entering the shell at the bottom thereof, extending upwardly therethrough, and means at the top of said shell for distributing plutonium and/or uranium containing particles in a slurry to said annulus and for conducting excess carrier fluid in said slurry away from said annulus.

8. The module of claim 7 wherein said coolant inlet is at the bottom of said shell and coolant entering therethrough passes upwardly through the center of said shell, then radially through said bed between said concentric conically shaped screens and then upwardly to a coolant outlet from said shell at the top thereof.

References Cited

UNITED STATES PATENTS

| 3,039,945 | 6/1962 | Slack et al. | 176—45 |
| 3,132,997 | 5/1964 | Busey | 176—49 |
| 3,287,910 | 11/1966 | Silverstein | 176—45 |
| 3,294,645 | 12/1966 | Susskind et al. | 176—45 |

FOREIGN PATENTS

| 845,804 | 8/1960 | Great Britain. |
| 946,114 | 1/1964 | Great Britain. |
| 946,901 | 1/1964 | Great Britain. |

CARL D. QUARFORTH, *Primary Examiner.*

H. E. BEHREND, *Assistant Examiner.*